(12) United States Patent
De Anna et al.

(10) Patent No.: US 10,172,198 B2
(45) Date of Patent: Jan. 1, 2019

(54) LIGHTING SYSTEM, RELATED ELECTRONIC CONVERTER AND METHOD OF DESIGNING A LIGHTING SYSTEM

(71) Applicant: OSRAM GmbH, Munich (DE)

(72) Inventors: Paolo De Anna, Vallà di Riese Pio X (IT); Francesco Angelin, Mogliano Veneto (IT); Valerio Michielan, Mogliano Veneto (IT); Enrico Raniero, Codiverno di Vigonza (IT)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/921,785

(22) Filed: Mar. 15, 2018

(65) Prior Publication Data

US 2018/0270924 A1    Sep. 20, 2018

(30) Foreign Application Priority Data

Mar. 16, 2017 (IT) .......................... 102017000029057

(51) Int. Cl.
*H05B 33/08*    (2006.01)
*H05B 37/02*    (2006.01)
*F21S 4/10*    (2016.01)

(52) U.S. Cl.
CPC ......... *H05B 33/0815* (2013.01); *H05B 37/02* (2013.01); *F21S 4/10* (2016.01)

(58) Field of Classification Search
CPC ............ H05B 33/0815; H05B 33/0845; H05B 33/083; H05B 33/089; H05B 33/0809;
(Continued)

(56) References Cited

U.S. PATENT DOCUMENTS 9,420,644 B1    8/2016    Shum
2011/0291578 A1    12/2011    Philippbar et al.
(Continued)

FOREIGN PATENT DOCUMENTS

EP    1916878 A1    4/2008
EP    3139483 A1    3/2017
WO    2017060813 A1    4/2017

OTHER PUBLICATIONS

Italian Search Report based on application No. 102017000029057 (9 pages) dated Oct. 6, 2017 (for reference purpose only).

*Primary Examiner* — Wei Chan
(74) *Attorney, Agent, or Firm* — Viering, Jentschura & Partner MBB

(57) ABSTRACT

A lighting system includes an electronic converter, a lighting module and a switching stage. The electronic converter includes a transformer, a rectifier circuit and an output filter circuit. A capacitance is connected between the primary winding and the secondary winding. The lighting module includes a chain of LEDs and a current regulator, wherein the chain of LEDs is mounted onto a substrate of a metallic material, so that a parasitic capacitance is present between the lighting module and the substrate of a metallic material. The switching stage includes a field-effect transistor interposed in the negative line which connects the lighting module to the electronic converter, and a control unit configured to drive the gate terminal of the transistor as a function of a dimming signal.

The switching stage includes a diode connected to negative output terminal of the switching stage and to positive output terminal of the switching stage.

9 Claims, 5 Drawing Sheets

(58) Field of Classification Search
CPC ............ H05B 33/0827; H05B 33/0851; H05B 33/0848; H05B 33/0803
USPC ... 315/307, 186, 200 R, 201, 294, 224, 291, 315/85, 122
See application file for complete search history.

(56) References Cited

U.S. PATENT DOCUMENTS

2012/0275195 A1   11/2012  Cividino et al.
2012/0306403 A1*  12/2012  Chung ............... H05B 33/0818
                                                                  315/291
2016/0205736 A1    7/2016  Jin et al.

* cited by examiner

LIGHTING SYSTEM, RELATED ELECTRONIC CONVERTER AND METHOD OF DESIGNING A LIGHTING SYSTEM

RELATED APPLICATION(S)

This application claims priority to Italian Patent Application No. 102017000029057, filed Mar. 16, 2017, the entirety of which is incorporated herein by reference.

TECHNICAL FIELD

Various embodiments relate to lighting systems.

BACKGROUND

FIG. 1 shows a typical lighting system, including an electronic converter 10 and at least one lighting module 20. Generally speaking, a lighting module 20 includes one or more light radiation sources, including e.g. at least one LED (Light Emitting Diode) or other solid-state lighting means, such as laser diodes.

Specifically, in the presently considered example, the electronic converter is an AC/DC converter. Therefore, the electronic converter 10 includes two input terminals 102a and 102b, for the connection to the mains, and two output terminals 104a and 104b for the connection to the lighting module(s) 20. Typically, line 102a is connected to phase L and terminal 102b is connected to neutral N.

For example, FIG. 1 shows a lighting system wherein the electronic converter 10 is a voltage generator, and similarly the lighting module 20 is a module configured to be supplied with a voltage.

Therefore, in FIG. 1, the electronic converter 10 receives at input, via terminals 102a and 102b, an alternating voltage $V_{in}$, such as e.g. 110 or 230 VAC, and provides at output, via the positive terminal 104a and the negative terminal 104b, a regulated voltage $V_{out}$, such as e.g. 12 or 24 VDC.

For example, FIG. 2 shows an example of a lighting module 20 configured to be supplied by a regulated voltage $V_{out}$. Specifically, lighting module 20 include a positive input terminal 200a and a negative input terminal 200b, for the connection to the terminals 104a and 104b of the electronic converter 10. For example, lighting module 20 may be connected, directly or through a cable, to the electronic converter 10. Therefore, terminal 200a is connected to positive terminal 104a, and terminal 200b is connected to negative terminal 104b, and the lighting module thus receives the voltage $V_{out}$.

In the presently considered example, the lighting module 20 is a LED module including one or more LEDs L (or laser diodes), which are connected between the terminals 200a and 200b. For example, module 20 may include a chain or string of LEDs 22, wherein a plurality of LEDs L (or laser diodes) is connected in series. Moreover, the LEDs L (or laser diodes) may also be divided along various branches connected in parallel. For example, as shown in FIG. 2, module 20 may include a first string of LEDs 22a including a first group of LEDs L connected in series, and a second string of LEDs 22b including a second group of LEDs L connected in series. Similarly, a plurality of lighting modules 20 may be connected in parallel to the terminals 104a and 104b.

Given that the lighting module 20 is supplied with a voltage, the lighting module 20 typically includes a current regulator 24, which is connected in series with each string of LEDs 22. For example, the first string of LEDs 22a and a first current regulator 24a are connected (e.g. directly) in series between the terminals 200a and 200b, and the second string of LEDs 22b and a second current regulator 24b are connected (e.g. directly) in series between the terminals 200a and 200b. Therefore, in the presently considered example, strings 22a and 22b (and similarly the string of LEDs of other lighting modules) are supplied with a common voltage ($V_{out}$).

In the simplest of cases, the current regulator 24 may be a resistor or a linear current regulator. The current regulator 24 may also be implemented with current mirrors or with a switched mode current regulator, typically including an inductor and an electronic switch.

As a safety measure, the electronic converter 10 is often required to be an insulated converter. Therefore, in such an instance, the electronic converter 10 includes at least one transformer T, including a primary winding T1 and a secondary winding T2.

For example, FIG. 3 shows the schematic operation diagram of a switched mode electronic converter 10.

In this case, converter 10 includes, between the input terminals 102a and 102b and the primary winding T1 of transformer T, a rectifier circuit 108 and a switching stage 112.

Specifically, the input of the rectifier circuit 108, such as e.g. a diode bridge, is connected (e.g. directly) to terminals 102a and 102b. Therefore, the rectifier circuit 108 receives at input the input voltage $V_{in}$ and provides at output a DC voltage $V_{in,DC}$.

Generally speaking, between the input terminals 102a and 102b and the rectifier circuit 108 there may also be provided a filter circuit 106, configured to filter the noise produced by the electronic converter.

The switching stage 112 includes one or more electronic converters, which are adapted to selectively connect the terminals of the primary winding T1 of transformer T to voltage $V_{in,DC}$ supplied by the rectifier circuit 108.

Generally speaking, between the rectifier circuit 108 and the switching stage 112 there may be provided a filter circuit 110, such as e.g. a capacitor connected in parallel with the output terminals of the rectifier circuit 108. Therefore, in the present case, the filter circuit 108 receives (e.g. directly) voltage $V_{in,DC}$ and supplies at output a filtered voltage, typically known as bus voltage $V_{bus}$. In this case, therefore, the switching stage 112 receives at input voltage $V_{bus}$.

Said alternating voltage to the secondary side is subsequently converted by a rectifier circuit 114, typically including one or more diodes (such as e.g. a diode bridge), into a DC voltage. Therefore, the input of the rectifier circuit 114 is connected (e.g. directly) to the terminals of the secondary winding T2 of transformer T, and provides at output a DC voltage which, in the simplest of cases, corresponds to the output voltage $V_{out}$. Preferably, there is provided a filter circuit 116 connected between the output of the rectifier circuit 114 and the output of converter 10, i.e. the terminals 104a and 104b. Therefore, the filter circuit 116 is configured to stabilize the voltage provided by the rectifier circuit 114. For example, possible rectifier circuits 114 (optionally employing a transformer with an intermediate connection) and filter circuits 116 are described in document PCT/IB2016/055923, the content whereof is incorporated herein by way of reference.

Thus, in a switching converter, transformer T receives on the primary side an alternating voltage having a switching frequency determined by the switching stage 112. Typically, the switching frequency is in the range between 1 kHz and 200 kHz, preferably between 20 kHz and 200 kHz. One or more capacitors $C_Y$ may often be connected between the primary winding T1 and the secondary winding T2, in order to filter a possible common mode noise.

The electronic converter 10 moreover includes a control circuit 118, configured to generate one or more driving signals DRV for driving the switching stage 112, so as to regulate the output voltage $V_{out}$ to a desired value. Generally speaking, the control circuit 118 may be any analogue and/or digital circuit, such as e.g. a microprocessor programmed via software code.

To this end, a feedback circuit 120 is typically provided which supplies a feedback signal FB, which is determined as a function of the output voltage $V_{out}$. Typically, the feedback circuit 120 includes an optocoupler (in order to enable an insulated feedback) and optionally an error amplifier, typically a PI (Proportional-Integral) or PID (Proportional-Integral-Derivative) regulator.

This general architecture of a switched mode electronic converter is described e.g. in document US 2012/0275195 A1. The various topologies of switched mode electronic converters are well known; the main topologies (flyback, forward, etc.) are described e.g. in L. Wuidart, "*Application Note—Topologies For Switched Mode Power Supplies*", STMicroelectronics, 1999.

As shown in FIG. 4, generally speaking, the electronic converter 10 may also be a DC/DC electronic converter.

In this case, the input terminals 102a and 102b are connected to a DC voltage generator, such as a battery, or the input voltage $V_{in}$ is a DC voltage. In this case, the rectifier circuit 108 is not mandatory, and the optional filter circuits 106 and 110 may be combined into one filter circuit. As for the other features, the architecture corresponds to FIG. 3.

The light emitted by the light radiation sources of the lighting module 20 is often also required to be adjustable, offering therefore a so-called dimming function.

Specifically, as shown in FIG. 5, the electronic converter 10 shown in FIG. 3 or 4 may include at output a switching stage 122 including one or more electronic switches. Specifically, said switching stage 122 is configured to enable or disable the output of electronic converter 10.

For example, in FIG. 5, the switching stage 122 includes an electronic switch SW connected in series with the lighting module 20. For example, said electronic switch SW may be connected (e.g. directly) between the negative terminal of the filter circuit 116 and the negative output terminal 104b. Therefore, in the presently considered example, the switch SW is a low-side switch, and may be implemented with an re-channel FET (Field-Effect Transistor).

The control circuit 118 may therefore generate a driving signal CTRL (which is suitably transmitted to the secondary side of transformer T) for said switching stage 122, specifically the electronic switch SW, as a function of a dimming signal DIMM. According to this solution, converter 10 therefore performs the dimming operation by regulating the average current flowing through the lighting module 20, by switching on/off the output of converter 10 and therefore the lighting module 20. For example, for this purpose a Pulse Width Modulation (PWM) driving signal CTRL is often used, wherein the control circuit 118 varies the duty cycle of said signal CTRL as a function of the dimming signal DIMM. Typically, the frequency of the PWM modulation is in the range between 100 Hz and 2 kHz. Generally speaking, the dimming signal DIMM may be any analogue or digital signal. Generally speaking, the dimming signal DIMM may be received through a further terminal 102c of the electronic converter 10, and/or it may be generated internally, e.g. as a function of other signals, e.g. a signal indicative of the brightness of the light in the environment.

Generally speaking, the dimming function and specifically stage 122 may also be implemented in a separated device, i.e. a so-called dimmer.

As shown in FIG. 6, in this case the electronic converter provides (as described with reference to FIGS. 3 and 4) a voltage $V_{out}$. However, a device/dimmer 30 is interposed between the electronic converter 10 and the lighting module 20, therefore switching the supply to lighting module 20 on or off. Specifically, in this architecture, device 30 includes two terminals 302a and 302b, for the connection to the terminals 104a and 104b of the electronic converter 10. Moreover, the device 30 includes two terminals 304a and 304b for the connection to the terminals 200a and 200b of the lighting module 20 (or to the first lighting module in a chain of modules); in other words, the lighting module 20 is connected (e.g. via a cable) to the terminals 304a and 304, and not directly to the terminals 104a and 104b of the electronic converter 10.

Similarly to what has been described with reference to FIG. 5, device 30 includes a switching stage 122, including one or more switches adapted to interrupt the electrical connection between the terminals 302a and 304a and/or between the terminals 302b and 304b. For example, FIG. 6 shows an electronic switch SW which is connected between terminals 302b and 304b, i.e. the negative terminals. The device/dimmer 30 moreover includes a control circuit 306 which generates a control signal CTRL, such as e.g. a PWM signal, for driving switch SW (also see the description of FIG. 5). Typically, the device/dimmer 30 also includes a sensor 308, which supplies a dimming signal DIMM indicative of the required brightness, or the control circuit 306 generates the driving signal CTRL as a function of the dimming signal DIMM. For example, sensor 308 may be a light sensor, a user interface, e.g. a potentiometer, for directly varying the dimming signal DIMM, and/or an infrared or radiofrequency detector for receiving a signal transmitted by a remote control.

The electronic converters 10 described with reference to FIGS. 3 to 6 offer the advantage that, by using a transformer T having a suitable electrical insulation (e.g. a double or reinforced insulation) between the primary winding T1 and the secondary winding T2, the output voltage $V_{out}$ may be a SELV (Safety Extra-Low Voltage). To this end, the components which are supplied with high voltage, i.e. the components on the primary side of transformer T (blocks 106 to 112) are typically mounted within a housing of an insulating material.

For example, FIGS. 7a and 7b show two views (from above and from the side) of an electronic converter 10.

In the presently considered example, the components of electronic converter 10 are mounted on a printed circuit 124. For example, the terminals 104a and 104b of the electronic converter 10 may be implemented via quick connection means, such as e.g. a screw or spring terminal block having e.g. two contacts. Similarly, the terminals 102a and 102b for the connection to the mains/battery and optionally the terminal 102c for the dimming signal DIMM may be implemented via quick connection means, e.g. terminal blocks.

In order to protect the user from electrocution, the other components (at least the components on the primary side, and preferably all the blocks 106-122 and transformer T) of the electronic converter 10 are mounted within a housing 126, typically of an insulating material such as a plastic material. In the presently considered example, the converter 10 is therefore a class II device, having no ground connection, but the high voltage components are protected by an electrical insulation. Generally speaking, the term class II does not necessarily imply that the housing is insulating, but that a double insulation is present between the outer surfaces thereof and the mains.

FIGS. 8a and 8b show two views (from above and from the side) of a lighting module 20.

Specifically, also the components of the lighting module 20 may be mounted onto a printed circuit 202, optionally a flexible printed circuit. Moreover, also the terminals 200a and 200b of the lighting module 20 may be implemented by quick connection means, such as e.g. a screw or spring terminal block having e.g. two contacts. Additionally, the lighting module 20 often includes two further terminals 200'a and 200'b, which are internally connected to terminals 200a and 200b, i.e. such terminals supply voltage $V_{out}$ as well. Therefore, said terminals may be used for connecting the terminals 200a and 200b of a further lighting module to the terminals 200'a and 200'b of the lighting module 20, and not directly to the terminals 104a and 104b of the electronic converter 10.

Also the components of the lighting module 20 are often protected, e.g. by a housing 204 and/or protection layers, e.g. silicone layers. However, as voltage $V_{out}$ is low, said protection is mainly destined to protect the components from a mechanical point of view (e.g. in order to implement an IP protection) and/or for aesthetic reasons.

As shown in FIG. 8b, typically LEDs L (and optionally regulator 24) are mounted onto a first face of the printed circuit 202, while on the opposite face there may be provided a heatsink 206, typically of a metallic material.

The inventors have observed that the previously discussed lighting systems may cause an apparently inexplicable malfunction or failure.

SUMMARY

The present specification aims at providing solutions in order to avoid said malfunction or failure.

According to various embodiments, said object is achieved thanks to a lighting system having the features set forth in the claims that follow. The claims also concern a corresponding electronic converter and method of designing a lighting system.

The claims are an integral part of the technical teaching provided herein with reference to the various embodiments.

As previously mentioned, the present specification concerns a lighting system including a switched mode electronic converter, an additional switching stage for a dimming operation and a lighting module.

In various embodiments, the electronic converter is a switched mode electronic converter including a transformer, e.g. a SELV transformer.

The primary winding of the transformer is coupled via a switching stage to the input terminals. For example, if the input voltage is an AC voltage, the electronic converter includes, on the primary side, a rectifier circuit and a switching stage configured to selectively transfer the continuous voltage supplied by the rectifier circuit to the primary winding of the transformer. On the other hand, if the input voltage is already a DC voltage, the switching stage may selectively transfer the input voltage to the primary winding of the transformer. For this purpose, the electronic converter includes a control unit, which is configured to drive the switching stage as a function of the output voltage.

On the other hand, the secondary winding of the transformer is connected to a rectifier circuit. Specifically, in various embodiments, a capacitance is connected between the primary winding and the secondary winding. In various embodiments, the electronic converter may include an output filter circuit, wherein the input of the output filter circuit is connected to the output of the rectifier circuit, and the output of the output filter circuit provides the continuous output voltage.

In various embodiments, the electronic converter is a class II device, wherein at least the components between the two input terminals and the primary winding, i.e. the high voltage components, are mounted within a housing.

In various embodiments, the lighting module includes a positive terminal and a negative input terminal. A chain of LEDs (or laser diodes) and a current regulator are connected in series between said terminals. The chain of LEDs (or laser diodes) is mounted onto a metallic substrate, e.g. a heatsink, so that a parasitic capacitance is present between the lighting module and the metallic substrate.

In various embodiments, the switching stage (which is connected between the output voltage of the electronic converter and the input of the lighting module) includes two input terminals and two output terminals.

Generally speaking, the electronic converter and the switching stage may be integrated into one single device, or the switching stage may be included in a separate dimmer which is connected (typically via cables) between the electronic converter and the lighting module.

In various embodiments, the switching stage includes a field-effect transistor interposed in the negative line connecting the electronic converter to the lighting module. In various embodiments, the switching stage has a control unit associated thereto, which is configured to drive the gate terminal of the transistor as a function of a dimming signal.

Generally speaking, the transistor has a breakdown voltage which is typically higher than the output voltage. Therefore, when a negative transition is applied to the input terminals of the electronic converter, said negative transition is transferred, through the capacities between the primary winding and the secondary winding, to the source terminal of the transistor. However, when the transistor is open, the drain terminal of the transistor is kept at a substantially constant voltage through the parasitic capacitance to ground, created by the metallic substrate. Therefore, a voltage is generated between the drain and source terminals of the transistor. This voltage therefore also appears across the lighting module, with a reversed polarity with respect to the normal operation of the lighting module.

In order to reduce the negative effect of said voltage, the switching stage includes a diode. Specifically, the anode of the diode is connected to the negative output terminal of the switching stage, and the cathode of the diode is connected to the positive output terminal of the switching stage.

Moreover, without the diode, the voltage between the drain and source terminals of the transistor may exceed the breakdown voltage of the transistor, i.e. the transistor undergoes breakdown. On the contrary, if a diode is present, when the voltage between the drain and source terminals of the transistor reaches the value of the output voltage, the diode is closed, therefore preventing a negative voltage from being supplied to the lighting module.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

In the following description, various specific details are given to provide a thorough understanding of the embodiments. The embodiments may be practiced without one or several specific details, or with other methods, components, materials, etc. In other instances, well-known structures, materials or operations are not shown or described in detail in order to avoid obscuring various aspects of the embodiments.

Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring exactly to the same embodiment. Furthermore, particular features, structures, or characteristics may be combined in any suitable manner in one or more embodiments.

The headings provided herein are for convenience only, and therefore do not interpret the extent of protection or scope of the embodiments.

In the following FIGS. 9 and 10, the parts, the elements or the components which have already been described with reference to FIGS. 1 to 8 are denoted with the same references which have previously been used in said Figures; the description of said previously described elements will not be repeated in the following, in order not to overburden the present detailed description.

As previously mentioned, the present specification aims at providing solutions which enable reducing or avoiding malfunctions or failures in a lighting system as described with reference to FIGS. 1 to 8. Therefore, the related description will not be repeated in the following.

Specifically, the inventors have observed that one or more of the LEDs L mounted inside a lighting module 20 may be damaged after a variable operating time of the system, although the electronic converter 10 does not exhibit deficiencies.

Figure 1:
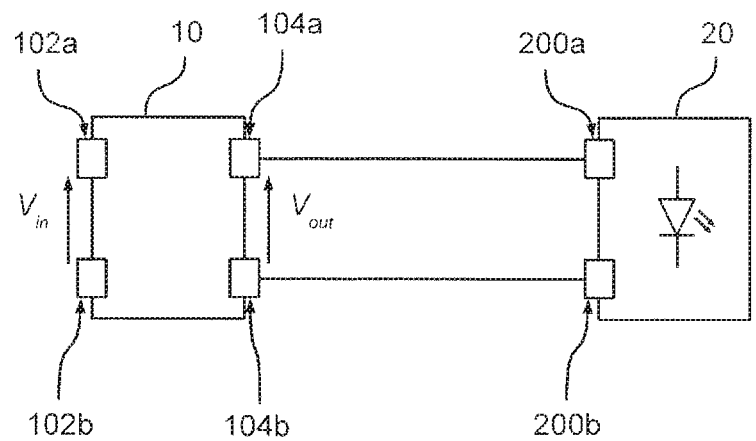
FIGS. 1 to 8b have already been described in the foregoing.
Figure 2:
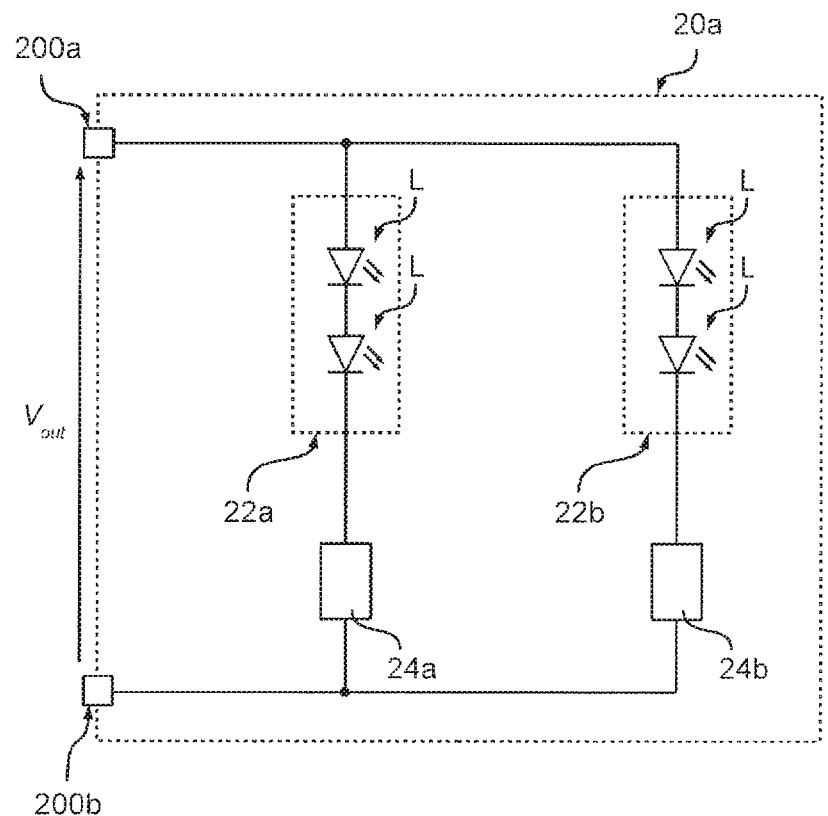
Figure 3:
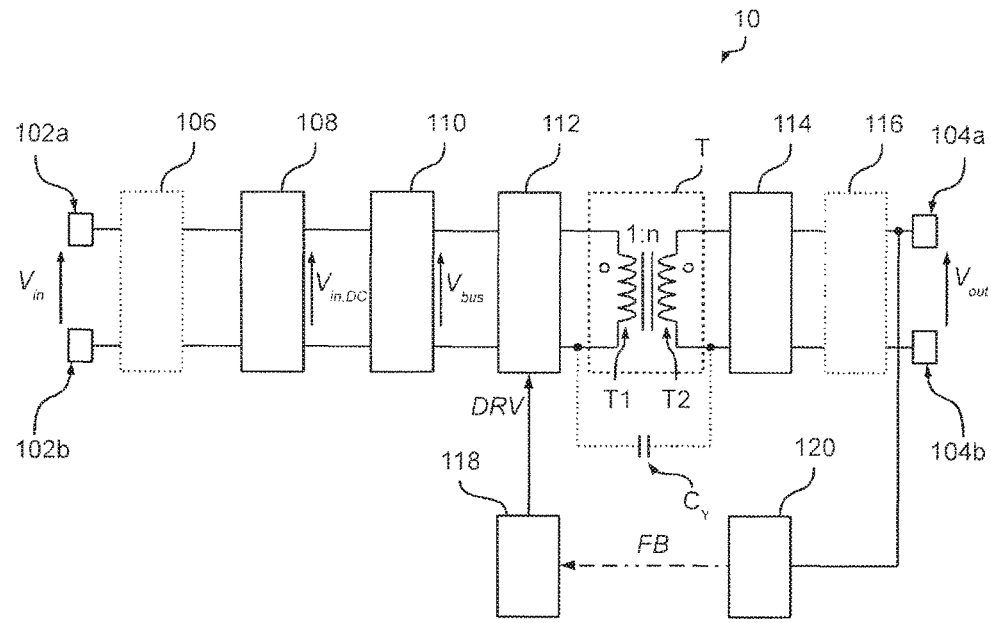
Figure 4:
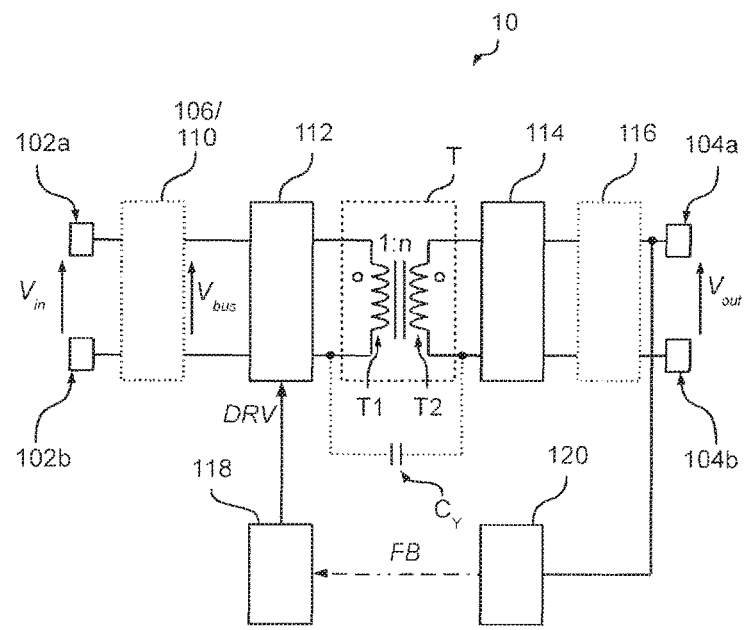
Figure 5:
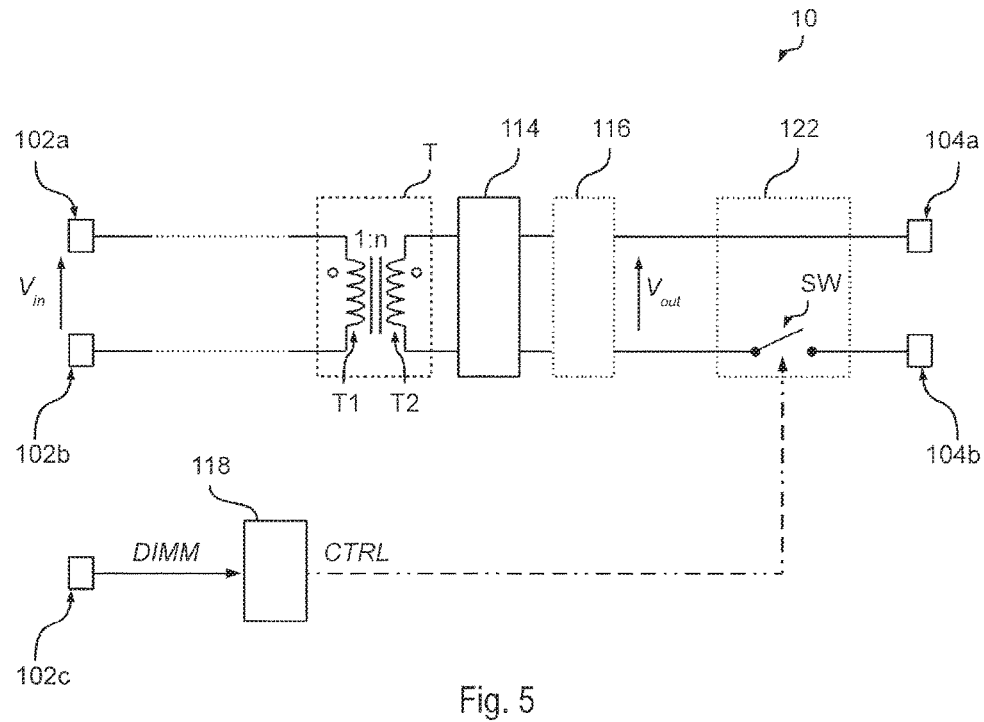

Specifically, said malfunction only appears in the lighting systems described with reference to FIGS. 5 and 6, i.e. systems providing a dimming function, wherein voltage $V_{out}$ at the output of the electronic converter is periodically switched on and off, typically via a driving signal CTRL by using a PWM modulation.

Therefore, it was initially assumed that the LEDs were unable to withstand the repeated on/off switching.

On the contrary, after a careful analysis of the system, specifically by simulating the electric circuit, the inventors were able to identify the origin of the malfunction as a combination of features which, taken singularly, do not represent a problem and which may even be desired, but which, if combined, may give rise to a temporary abnormal behaviour which may destroy the LEDs within a lighting module 20.

Specifically, the source of the problem has been identified in the heatsink 206, or in a metallic support hosting the LEDs of the lighting module 20. As a matter of fact, said metallic body is coupled, via a parasitic capacitance, to the LED circuit of the lighting module 20, and specifically to the track connected to terminal 200b of the lighting module 20. Specifically, if the LEDs form strings of LEDs, said negative track may be long and, as a consequence, the capacitance may be rather large. Moreover, also the metallic body 206 is often connected directly to ground, or in any case exhibits a large capacitance towards ground, which is therefore connected in series with the capacitance between the negative track and the metallic body, in such a way as to create a similar capacitive track between the LEDs and ground. Therefore, generally speaking, a capacitive coupling, which is subsequently modelled with a capacitance $C_S$, is present between the negative track of the lighting module 20 and ground.

Figure 9:
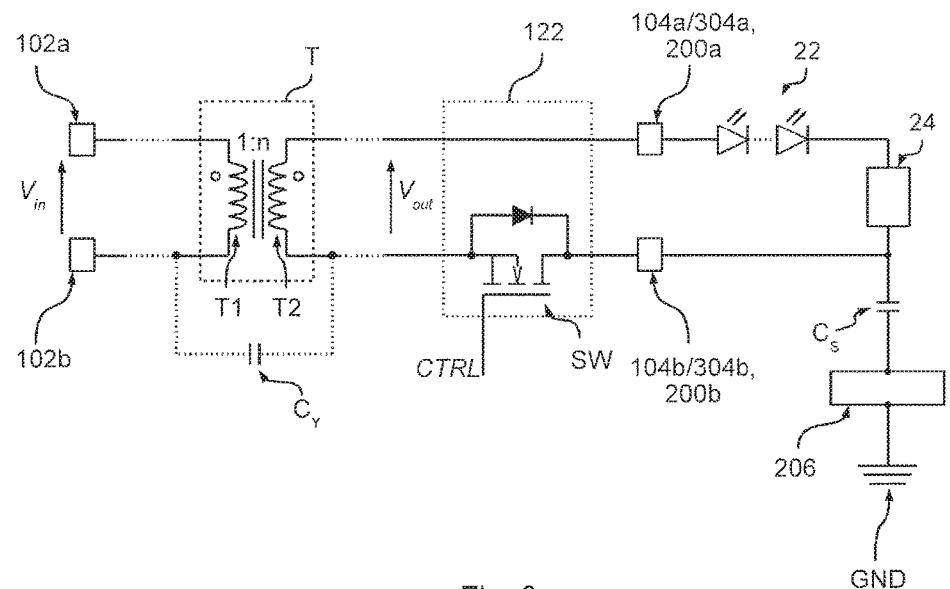
FIG. 9 shows a model of the lighting systems of FIGS. 5 and 6.

Specifically, FIG. 9 schematically shows the electrical circuit of the components that are involved in the abnormal behaviour. Specifically, such components include:
the (typically SELV) transformer T;
the capacitor $C_y$ (or a similar parasitic capacitance) between the primary winding T1 and the secondary winding T2 of transformer T, typically in the range between 200 pF and 2.2 nF;
the switch SW interposed in the negative line (104b, 304b, 200b), i.e. the negative terminal 200b is disconnected from terminal 104b/304b when the switch SW is open;
the switch SW is an n-channel FET, such as a MOSFET (Metal-Oxide-Semiconductor Field-Effect Transistor);
the LED module 20 includes a heatsink 206, or more generally the LED module 20 is mounted onto a metallic support, i.e. a parasitic capacitance $C_S$ is connected between terminal 200b and ground.

Specifically, the behaviour of said circuit has been simulated, and the voltage $V_{SW}$ to switch SW and the voltage $V_{LED}$ to the chain of LEDs 22 have been monitored.

Specifically, by analysing the behaviour of the circuit during normal operation, no abnormal behaviours may be observed, apart from a small oscillation of voltage $V_{LED}$ when switch SW is opened.

However, a positive transition of the mains line (with respect to ground), or at terminals 102a or 102b, is also applied to the source terminal of FET SW through capacitance $C_Y$ and the parasitic capacities of transformer T. Therefore, also the source terminal of transistor SW follows the transition and (due to the body diode of transistor SW, or because transistor SW is closed), also the drain terminal follows the transition, therefore charging the capacitance $C_S$.

On the other hand, a negative transition from the mains (with respect to ground), i.e. at terminals 102a or 102b, is also applied to the source terminal of FET SW through capacitance $C_Y$ and the parasitic capacities of transformer T. Therefore, also the source terminal of transistor SW follows the transition, while (if transistor SW is open) the drain terminal substantially keeps its level due to capacitance $C_S$, which is typically large compared to capacitance $C_Y$, e.g. higher than 10 nF.

As a consequence, the voltage $V_{SW}$ between the drain and source terminals of transistor SW increases, and may exceed the output voltage $V_{out}$. Specifically, a negative voltage is applied to the LED module 20 when voltage $V_{SW}$ exceeds output voltage $V_{out}$.

Moreover, voltage $V_{SW}$ between the drain and source terminals of transistor SW may also exceed the breakdown voltage of said transistor SW. Such breakdown therefore limits the maximum (negative) voltage which may be applied to the LED module 20. Typically, transistor SW has a breakdown voltage in the range between 30 and 120 V, and generally higher than output voltage $V_{out}$. For example, assuming a breakdown voltage of 80 V and a voltage $V_{out}$ of 24 V, a voltage amounting to −80 V+24 V=−56 V is applied between terminals 200a and 200b of the LED module 20. This negative voltage is applied as long as the voltage at the nodes L/N undergoes a negative transition. Therefore, a very high negative voltage may be applied to the lighting module 20, and the duration of said transition may even amount to tens or hundreds of microseconds. Such negative voltages may therefore actually damage the LEDs L of a lighting module 20.

Generally speaking, the breakdown of transistor SW may also damage switch SW. However, the tests carried out by the inventors have shown that this is less likely to occur in comparison with a damage to LEDs L, because FETs are typically more robust.

Figure 10:
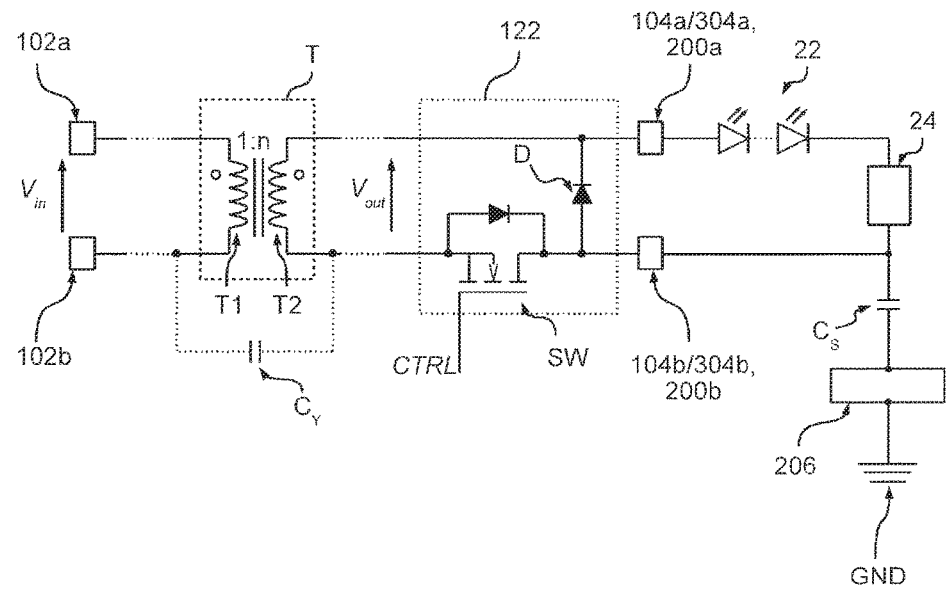
FIG. 10 shows and embodiment of a lighting system which overcomes certain malfunctions of the lighting systems of FIGS. 5 and 6.

FIG. 10 shows a possible solution to said problem.

Figure 6:
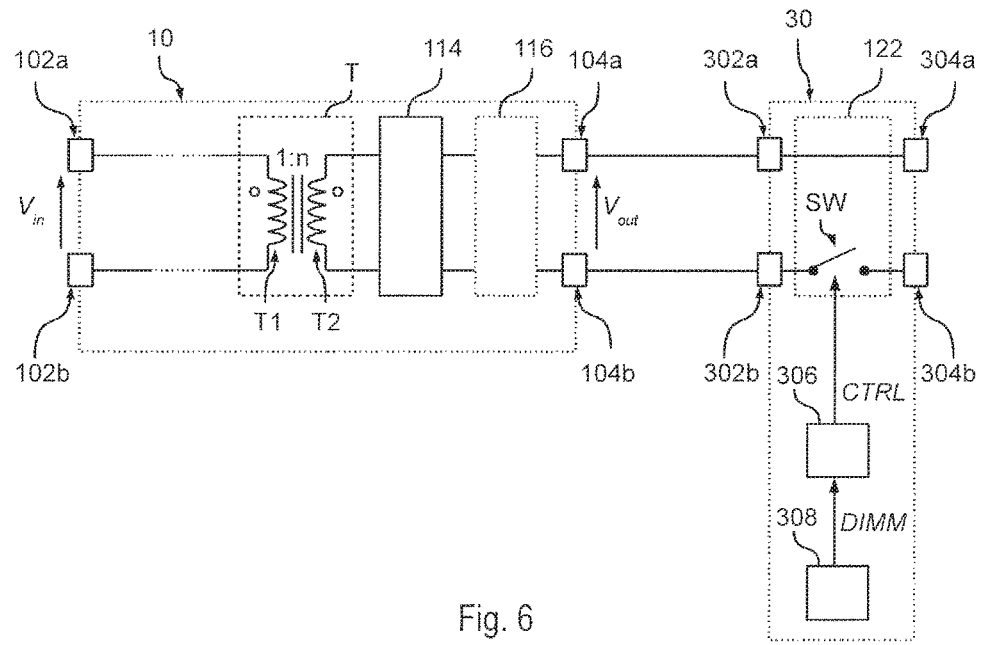
Figure 7A:
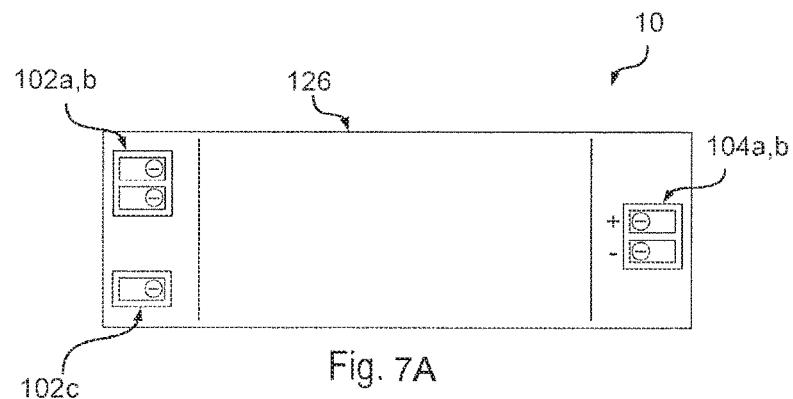
Figure 7B:
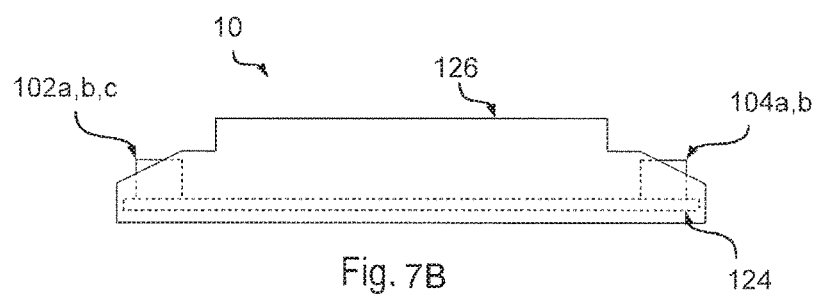
Figure 8A:
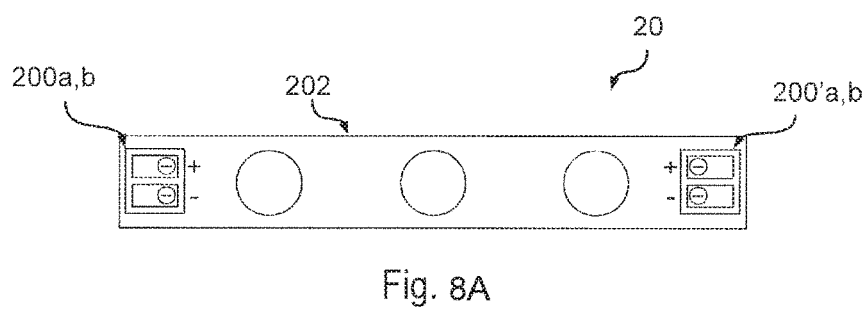
Figure 8B:
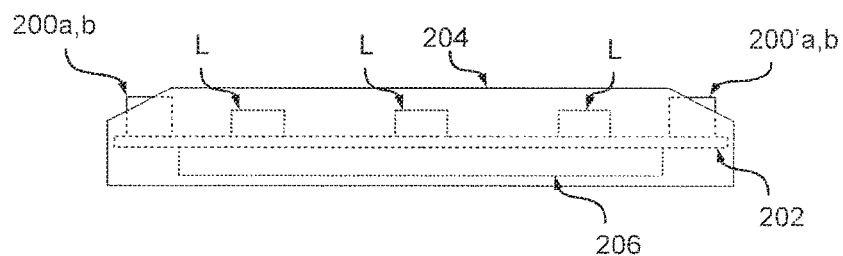

Specifically, for this purpose the presently considered embodiment proposes a change of the switching stage 122 which is used directly within the electronic converter 10 (see e.g. FIG. 5) or within a dimmer 30 (see e.g. FIG. 6).

Specifically, as described in the foregoing, the switching stage 122 includes a positive input terminal and a negative input terminal for receiving voltage $V_{out}$. For this purpose, the input terminals are connected (directly or indirectly, via terminals 302a, 302b and 104a and 104b) to the rectifier circuit 114 or to the filter circuit 116. Moreover, the switching stage 122 includes a positive output terminal and a negative output terminal, which are connected (via the terminals 104a and 104b, or the terminals 304a and 304b) to the terminals 200a and 200b of a lighting module 20.

Specifically, the positive input terminal of stage 122 is connected (e.g. directly and internally) to the positive output terminal of stage 122. On the other hand, the negative input terminal of stage 122 is connected through an electronic switch SW to the negative output terminal of stage 122. In various embodiments, the electronic switch SW is an n-channel FET. In this case, the source terminal of transistor SW is connected (e.g. directly) to the negative input terminal of stage 122, and the drain terminal of transistor SW is connected (e.g. directly) to the negative output terminal of stage 122. On the other hand, the gate terminal of transistor SW is connected to a control unit (118 or 306) which generates a driving signal for switching transistor SW as a function of a dimming signal DIMM.

In various embodiments, the switching stage moreover includes a diode D connected (within switching stage 112 and directly) between the positive output terminal and the negative output terminal of stage 122. Specifically, the anode of diode D is connected (e.g. directly) to the negative output terminal of stage 122, i.e. the drain terminal of transistor SW, and the cathode of diode D is connected (e.g. directly) to the positive output terminal of stage 122.

Said diode D, therefore, does not protect the blocks 106-116 of the electronic converter, but diode D prevents the appearance of negative voltages across the LED module, thus protecting the lighting module 20 (as well as transistor SW). Specifically, as previously explained, by applying a negative transition to terminals 102a and 102b (with reference to ground GND), said transition is transferred through capacitance $C_Y$ to the source terminal of transistor SW. On the contrary, the drain terminal of transistor SW is kept at a substantially constant voltage (with reference to ground GND) by the parasitic capacitance $C_S$. Therefore, also in the circuit shown in FIG. 10, a voltage is created between the drain and source terminals of transistor SW.

However, when the voltage between the drain and source terminals reaches the output voltage $V_{out}$, diode D closes, thus avoiding the appearance of a negative voltage between the terminals 200a and 200b of the lighting module 20.

On the contrary, if diode D is absent, the voltage between the drain and source terminals of transistor SW might keep on increasing, and a negative voltage would be applied between the terminals 200a and 200b of the lighting module 20. Moreover, the voltage might exceed the breakdown voltage of the transistor.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SIGNS

Electronic converter 10
Lighting module 20
String of LEDs 22
Current regulator 24
Device 30
Electronic converter input terminal 102
Electronic converter output terminals 104
Filter circuit 106
Rectifier circuit 108
Filter circuit 110
Switching stage 112
Rectifier circuit 114
Filter circuit 116
Control circuit 118
Feedback circuit 120
Switching stage 122
Printed circuit 124
Housing 126
Lighting module input terminal 200
Printed circuit 202
Housing 204
Heatsink 206
Device terminal 302
Device terminal 304
Control circuit 306
Sensor 308
Driving signal CTRL
Parasitic capacitance $C_S$
Capacitor $C_Y$
Diode D
Dimming signal DIMM
Driving signal DRV
Feedback signal FB
Ground GND
LED L
Electronic switch SW
Transformer T
Primary winding T1
Secondary winding T2
Input voltage $V_{in}$
Output voltage $V_{out}$

The invention claimed is:

1. A lighting system comprising: an electronic converter comprising: two input terminals configured to receive an input voltage, a positive output terminal and a negative output terminal for providing a continuous output voltage, a transformer comprising a primary winding and a secondary winding, wherein a capacitor is connected between said primary winding and said secondary winding, wherein said primary winding is coupled to said two input terminals, a rectifier circuit, wherein the input of said rectifier circuit is connected to said secondary winding of said transformer, and an output filter circuit, wherein the input of said output filter circuit is connected to the output of said rectifier circuit, wherein the output of said output filter circuit provides said continuous output voltage; a lighting module comprising a positive input terminal and a negative input terminal, and a string of LEDs or laser diodes and a current regulator connected directly in series between said positive input terminal and said negative input terminal of said lighting module, wherein said string of LEDs or laser diodes is configured to be mounted on a substrate in a metallic material, whereby a parasitic capacitance is arranged between the lighting module and said substrate in a metallic material; and a switching stage comprising: a positive input terminal and a negative input terminal connected directly to the positive and negative output terminals of said electronic converter, and a positive output terminal and a negative output terminal connected directly to the positive and negative input terminals of said lighting module, wherein said positive input terminal is connected directly to said positive output terminal; a field effect transistor, wherein the drain of said transistor is connected directly to said negative output terminal and the source of said transistor is connected directly to said negative input terminal, a control unit configured to drive the gate of said transistor as a function of a dimming signal, and a diode, wherein the anode of said diode is connected directly to the negative output terminal of said switching stage and the cathode of said diode is connected directly to the positive output terminal of said switching stage.

2. The lighting system according to claim 1, wherein said system is configured to, when a negative transition is applied to said two input terminals, transfer said negative transition via said capacitor to the source of said transistor, wherein the drain of said transistor is maintained at a substantially constant voltage via said parasitic capacitance, such that a voltage is created between the drain and the source of said transistor, wherein, when the voltage between the drain and the source of said transistor reaches said continuous output voltage, said diode is closed impeding that a negative voltage is created between the positive terminal and the negative terminal of said lighting module.

3. The lighting system according to claim 1, wherein said input voltage is an AC voltage, and said electronic converter comprises:
a further rectifier circuit configured to receive at input said AC input voltage and provide at output a continuous voltage,
a further switching stage configured to selectively transfer said continuous voltage to said primary winding of said transformer, and
a control unit configured to drive said further switching stage as a function of said continuous output voltage.

4. The lighting system according to claim 1, wherein said input voltage is a DC voltage, and said electronic converter comprises:
a further switching stage configured to selectively transfer said DC input voltage to said primary winding of said transformer, and
a control unit configured to drive said further switching stage as a function of said continuous output voltage.

5. The lighting system according to claim 1, wherein said transformer is a SELV transformer.

6. The lighting system according to claim 1, wherein said electronic converter is a class II device, wherein at least the components between said two input terminals of said electronic converter and said primary winding of said transformer are mounted within a housing.

7. The lighting system according to claim 1, wherein said electronic converter and said switching stage are integrated in a single device, wherein said single device comprises a positive output terminal connected to the positive output terminal of said switching stage and a negative output terminal connected to the negative output terminal of said switching stage.

8. The lighting system according to claim 7, wherein the positive output terminal of said single device is connected through a cable to the positive input terminal of said lighting module and the negative output terminal of said single device is connected through a cable to the negative input terminal of said lighting module.

9. The lighting system according to claim 1, wherein said switching stage is integrated in a dimmer, wherein said dimmer comprises a positive input terminal connected to the positive input terminal of said switching stage, a negative input terminal connected to the negative input terminal of said switching stage, a positive output terminal connected to the positive output terminal of said switching stage and a negative output terminal connected to the negative output terminal of said switching stage.

* * * * *